(12) United States Patent
Foletti et al.

(10) Patent No.: US 8,100,613 B2
(45) Date of Patent: Jan. 24, 2012

(54) DEVICE FOR MACHINING WORKPIECES, IN PARTICULAR AERONAUTICAL PARTS MANUFACTURED FROM SOLID BLOCKS OF RAW MATERIAL

(75) Inventors: Sandro Foletti, Piacenza (IT); Maurizio Ferrari, Pizzighettone (IT); Roberto Muselli, Piacenza (IT)

(73) Assignee: JOBS S.p.A. (IT)

( * ) Notice: Subject to any disclaimer, the term of this patent is extended or adjusted under 35 U.S.C. 154(b) by 1060 days.

(21) Appl. No.: 12/003,706

(22) Filed: Dec. 31, 2007

(65) Prior Publication Data

US 2009/0035081 A1 Feb. 5, 2009

(30) Foreign Application Priority Data

Jul. 30, 2007 (IT) .............................. BO2007A0538

(51) Int. Cl.
*B23C 1/00* (2006.01)
*B23Q 15/013* (2006.01)

(52) U.S. Cl. ........ 409/186; 409/230; 409/201; 409/210; 408/13

(58) Field of Classification Search .................. 409/144, 409/230, 201, 211, 216, 180, 184, 185, 186, 409/187, 188, 193–195, 210, 214, 218, 215; 408/13, 73, 10–12

See application file for complete search history.

(56) References Cited

U.S. PATENT DOCUMENTS

| 2,363,444 A * | 11/1944 | Shipman et al. | 409/215 |
| 2,669,162 A * | 2/1954 | Arliss | 409/144 |
| 4,720,221 A * | 1/1988 | Yoshioka et al. | 409/144 |
| 4,841,795 A | 6/1989 | Obrietan | |
| 5,458,443 A | 10/1995 | Belge | |
| 5,697,739 A * | 12/1997 | Lewis et al. | 409/230 |
| 6,231,280 B1 * | 5/2001 | Bullen | 408/143 |
| 6,752,750 B2 * | 6/2004 | Adachi et al. | 409/230 |
| 7,128,506 B2 * | 10/2006 | Ferrari et al. | 409/201 |
| 7,390,152 B2 * | 6/2008 | Harif et al. | 409/230 |
| 7,756,672 B2 * | 7/2010 | Schmall et al. | 702/158 |
| 2005/0232714 A1 * | 10/2005 | Ferrari et al. | 408/97 |

FOREIGN PATENT DOCUMENTS

| DE | 42 44 407 A1 | 7/1994 |
| DE | 10 2004 042 135 | 3/2006 |
| DE | 10 2004 062138 B3 | 3/2006 |
| EP | 0 234 272 A | 9/1987 |
| JP | 62 224541 A | 10/1987 |

OTHER PUBLICATIONS

European Search Report dated Mar. 24, 2009 from counterpart European patent application No. 08 160 751.7.

* cited by examiner

*Primary Examiner* — Erica E Cadugan
(74) *Attorney, Agent, or Firm* — Timothy J. Klima; Shuttleworth & Ingersoll, PLC

(57) ABSTRACT

Complex workpieces, particularly aeronautical parts made of solid stock presenting a bottom wall and at least one stiffening rib transverse to the bottom wall, are machined using a device having a tool head furnished with a transmission component rotatable about a relative longitudinal axis, and a tool, typically a milling cutter, connected to the transmission component and capable of piercing the transverse rib. The longitudinal axis of the tool is disposed obliquely to the longitudinal axis of the transmission component so that the stiffening rib can be pierced at a point close to the bottom wall of the workpiece. The device also incorporates a feeler mechanism associated with the tool head and designed to engage the bottom wall during the movement of the tool toward the machining location, in such a way that the position of the tool head can be actively controlled and the tool deployed at a selected distance from the bottom wall.

16 Claims, 11 Drawing Sheets

DEVICE FOR MACHINING WORKPIECES, IN PARTICULAR AERONAUTICAL PARTS MANUFACTURED FROM SOLID BLOCKS OF RAW MATERIAL

BACKGROUND OF THE INVENTION

The present invention relates to a device for machining workpieces, in particular aeronautical parts manufactured from solid blocks of raw material.

Essentially, the present invention finds application in any given industrial art field where holes or similar openings need to be drilled or cut along the joint lines of transverse surfaces or walls presented by a machinable workpiece or similar manufactured item.

More exactly, the invention has application particularly in the aeronautical construction sector, where there is a need to place drain and/or communication holes of various shapes and sizes in the cavities of workpieces, machined through stiffening members or ribs and located close to a corresponding bottom wall.

In the aeronautical sector, and in other sectors of industry such as rail transport, it is typically the case that where hollow structures of notable complexity are involved, generally with one or more bottom walls and a plurality of transverse stiffening members, condensation is liable to form within the hollow spaces due to variations in humidity, temperature and other factors, and must be drained from the structure.

Accordingly, structures of the type in question need to be furnished with a plurality of drain holes drilled through the stiffening members, adjacent to the corresponding bottom walls.

However, there are notable difficulties with the placement of holes in stiffening walls or ribs where these members are joined to a bottom wall, due principally to the restricted space afforded by the angles between the adjoining surfaces.

Normally, holes and/or openings allowing drainage and communication between the stiffening members are drilled manually by assembly fitters who are able to reach the areas near the bottom walls directly and without difficulty.

Whilst the methods employed currently to create drain holes near the bottom walls of the aforementioned structures are serviceable, the applicant finds that such procedures are not without certain drawbacks, and indeed are improvable in a number of ways, mainly as regards the length of time needed to fashion the holes, the associated costs, and the levels of precision required in performing the work.

In effect, the practice of detailing fitters to drill the drain holes in question involves significant expenditure in terms of time and resources, given that the holes must be drilled one by one, and with high levels of accuracy.

The object of the present invention is to overcome the problems associated with the prior art.

One object of the invention, in particular, is to provide a device such as will machine drain holes through the stiffening members and/or ribs of workpieces or complex structures, close to the respective bottom walls, without the need for any manual operations on the part of a fitter.

A further object of the invention is to provide a device by which the aforementioned drain holes can be machined to specified dimensions and parameters.

Yet another object of the present invention is to reduce the costs generated by machining drain holes in workpieces of the type described above.

SUMMARY OF THE INVENTION

The stated objects are substantially realized in a device according to the present invention for machining workpieces, in particular aeronautical parts manufactured from solid blocks of raw material, presenting a bottom wall and at least one stiffening wall transverse to the bottom wall.

The device comprises a tool head equipped with a transmission component rotatable about a relative longitudinal axis, presenting a first portion connectable rotatably to the drive of a machine, and a second portion associated with the end of the first portion remote from the driven end; also a tool able to pierce the transverse stiffening wall, connected operatively to the second portion of the transmission component and rotatable simultaneously with the transmission component about a relative longitudinal axis extending transversely to the longitudinal axis of the transmission component, in such a way that the transverse stiffening wall can be pierced at a point adjacent to the bottom wall.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
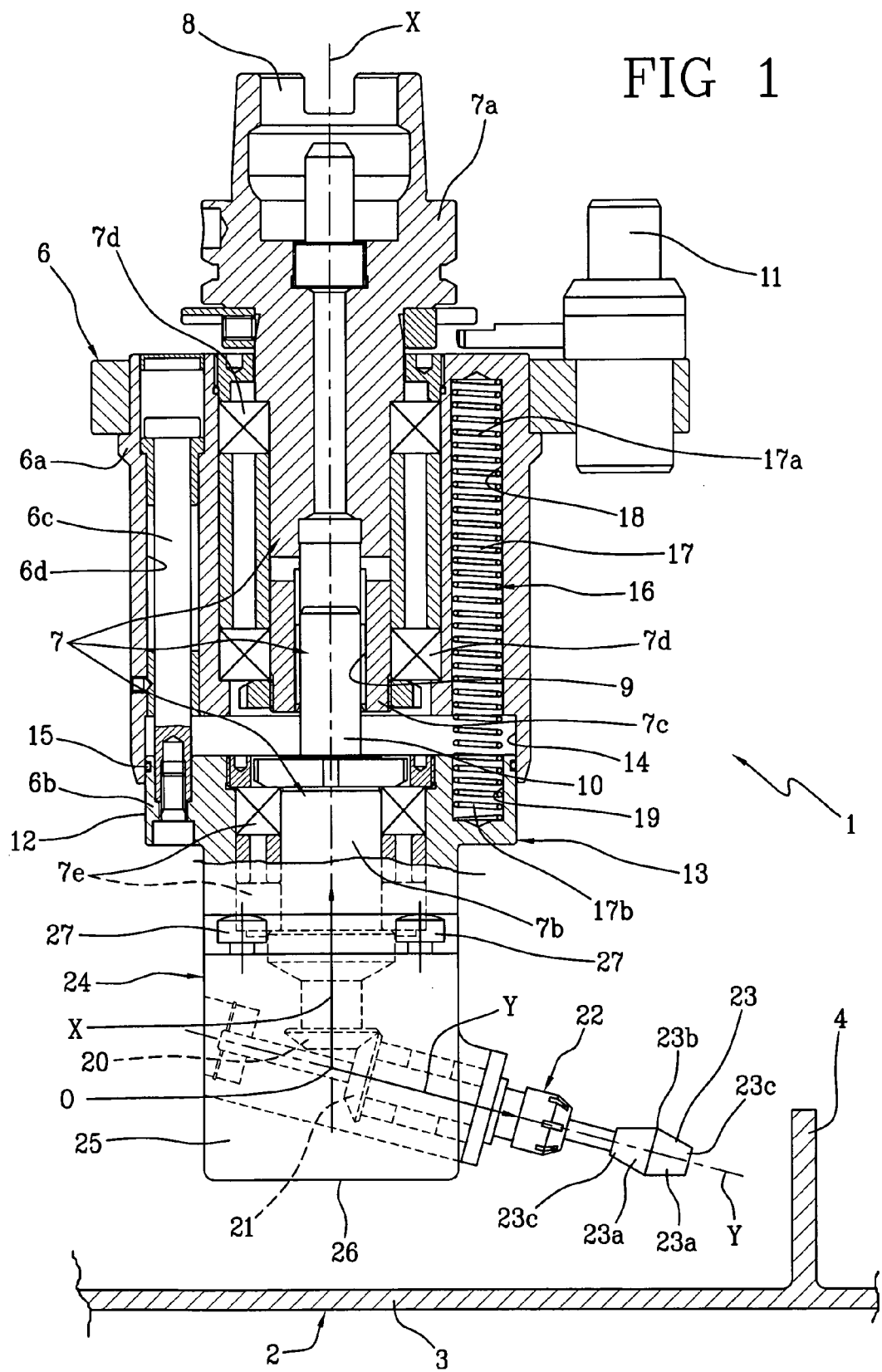
FIG. 1 shows a first embodiment of a device for machining workpieces according to the present invention, viewed in a front elevation, partly in section, and illustrated during a step of approaching a workpiece.
Figure 2:
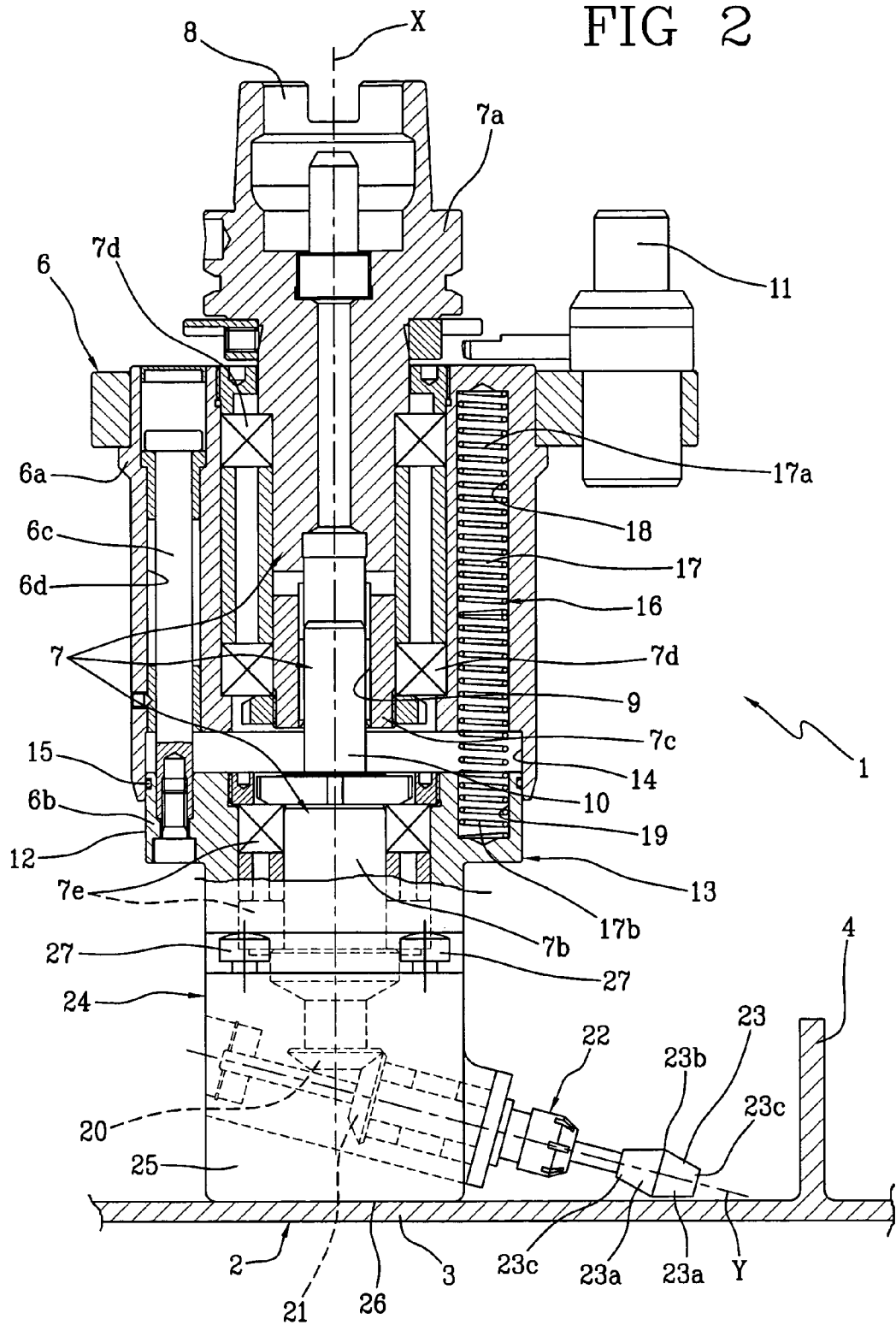
FIG. 2 shows a further front elevation of the device as in FIG. 1, viewed partly in section and illustrated during a step of engaging the workpiece.

With reference to the accompanying drawings, numeral 1 denotes a device for machining workpieces, in its entirety, and in particular a device for machining aeronautical parts manufactured from solid blocks of raw material.

In effect, the device 1 illustrated in the accompanying drawings is designed for use with workpieces 2 and/or structures of complex nature, for example aircraft segments or train sections, presenting one or more bottom walls 3 and at least one transverse stiffening wall 4.

In the case of the aeronautical sector, more exactly, workpieces 2 are machined by cutting material directly from solid blocks of high quality raw stock, presenting hollow structures furnished with a plurality of transverse stiffening walls and/or ribs 4. It happens generally, following the assembly of such hollow structures, that condensation will tend to form on the inside and must be drained off. To this end, sets of holes 5 are drilled through the transverse stiffening ribs 4 in positions adjacent to the relative bottom wall 3, so that water of condensation can run off toward predetermined drainage points.

To machine the aforementioned drain holes 5, the device 1 incorporates a tool head 6 comprising at least one transmission component 7 made up of a first portion 7a, connectable rotatably by way of a coupling 8 to the drive of a machine tool (not illustrated), preferably a numerically controlled multi-axis unit of familiar type, and a second portion 7b at the opposite end of the head from the first portion 7a. The transmission component 7 is rotatable about a relative longitudinal axis "X" and driven by the machine tool, which induces motion in the first portion 7a and consequently in the second portion 7b likewise.

FIGS. 1 to 5 illustrate a first embodiment of the device 1 according to the invention, in which the second portion 7b of the transmission component 7 is also capable of axial movement relative to the first portion 7a. More exactly, the first and second portions 7a and 7b of the transmission component 7 are engaged slidably one with another and capable of movement between a first position, in which the tool head 6 is fully extended in the longitudinal direction, and a second position in which the tool head 6 is fully contracted in this same direction.

The first portion 7a of the transmission component 7 presents an axial bore 9 at one end 7c, remote from the coupling 8, slidably accommodating a shaft 10 associated with the second portion 7b and extending parallel to the longitudinal axis "X". The bore 9 and the shaft 10 are shaped in such a way that the rotation of the first portion 7a is transmitted to the second portion 7b.

The tool head 6 comprises a first portion 6a and a second portion 6b connected operatively with the respective portions 7a and 7b of the transmission component 7 in such a way as to support the transmission component 7 freely in rotation. In particular, each support portion 6a and 6b carries the respective portion 7a and 7b of the transmission component 7 in corresponding bearings 7d and 7e that allow the selfsame transmission component 7 to rotate within the support portions 6a and 6b.

The first support portion 6a is fastenable by way of a fixing appendage 11 to a relative mounting (not illustrated) of the machine tool and coupled rotatably to the first portion 7a of the transmission component 7, whilst the second support portion 6b is coupled operatively to the first support portion 6a in such a way as will enable it both to carry the second portion 7b of the transmission component 7 in rotation and to slide axially in relation to the selfsame first support portion 6a.

To advantage, the second support portion 6b engages the first support portion 6a by way of guide rods 6c (one only of which is shown in FIGS. 1 to 4) rigidly associated with the second support portion 6b and slidable in sockets 6d afforded by the first support portion 6a, which extend parallel to the longitudinal axis "X" of the transmission component 7. The rods 6c ensure that the two support portions 6a and 6b remain coaxially aligned and therefore in faultless sliding association one with another. In addition, the second support portion 6b is housed partially within the first support portion 6a, thus creating a telescopic type of coupling between the two. In particular, one peripheral radial surface 12 presented by a rear end 13 of the second support portion 6b, next to the shaft 10, is breasted in contact with an internal surface 14 of the first support portion 6a, preferably in conjunction with interposed sealing means 15, such as an O-ring.

Still with reference to the first embodiment illustrated in FIGS. 1 to 4, the tool head 6 is equipped with elastic return means 16 interposed and operating between the first portion 7a and the second portion 7b of the transmission component 7.

In particular, the elastic return means 16 comprise at least one coil spring 17, or preferably, a plurality of coil springs encircling and extending parallel to the longitudinal axis "X", interposed between the first support portion 6a and the second support portion 6b, serving to bias the second portion 7b of the transmission component 7 toward the first position, that is to say the position in which the tool head 6 is fully extended longitudinally.

Each spring 17 presents a first end 17a seated in a housing 18 afforded by the first support portion 6a, and a second end 17b opposite to the first end 17a, seated in a housing 19 afforded by the second support portion 6b.

Alternatively, the elastic return means 16 could be embodied as respective gas springs containing air, for example, inserted directly between the first support portion 6a and the second support portion 6b or housed internally of respective pneumatic struts (not illustrated) interposed, like the coil springs 17, between the two support portions 6a and 6b. The resistance offered by the gas springs is determined by varying the pressure of the gas.

The second portion 7b of the transmission component 7 terminates in a bevel gear 20 meshing with a further bevel gear 21 attached to a tool 22, preferably a milling cutter 23. The tool 22 is designed to machine an opening in at least one transverse stiffening rib 4, which will function as a drain hole 5.

With a bevel drive thus created by the two gears 20 and 21, associated respectively with the transmission component 7 and with the tool 22, the selfsame tool will be driven in rotation about a relative longitudinal axis "Y" whenever the transmission component 7 is set in rotation.

To advantage, the longitudinal axis "Y" of the tool 22 extends transversely to the longitudinal axis "X" of the transmission component 7. Accordingly, the tool 22 is able to reach areas of the transverse stiffening rib 4 positioned close to the bottom wall 3, and the drain holes 5 can therefore be placed immediately adjacent to the bottom wall 3.

In a preferred solution, the longitudinal axis "Y" of the tool 22 and the longitudinal axis "X" of the transmission component 7 are disposed at an obtuse angle one relative to the other.

More exactly, and referring in particular to FIG. 1, which shows two half straight lines "x" and "y" drawn along the two longitudinal axes "X" and "Y", extending from a point of origin "O" that coincides with the intersection of the two axes, the one toward the tool head 6 and the other toward the tool 22, the angle formed by these same lines "x" and "y" and therefore by the axes "X" and "Y" is greater than 90°, with the result that the axis of the tool 22 will extend obliquely relative both to the bottom wall 3 and to the transverse stiffening rib 4 of the workpiece 2.

The tool head 6 is set in motion relative to the workpiece 2 through the agency of drive means (not illustrated) connected to an electronic control unit (likewise not illustrated). In particular, the tool head 6 is capable of movement referable to a system of Cartesian coordinates, and therefore translatable toward or away from the bottom wall 3 of the workpiece 2, or parallel to the plane occupied by the bottom wall, in such a way that the tool 22, and more exactly the cutter 23, can be maneuvered into the required position.

Advantageously, the device 1 comprises means 24 by which to sense the position of the bottom wall 3 presented by the workpiece 2, such as will come into operation when the tool head 6 approaches the cutting position. In detail, the sensing means 24 are associated with the tool head 6 in such as way as will guarantee that the tool 22 can be positioned at a predetermined distance from the bottom wall 3 of the workpiece 2, thereby ensuring placement of the drain hole 5 in the respective stiffening rib 4 at the required position.

In a preferred solution, the sensing means 24 comprise at least one feeler element 25 associated with and projecting from the end of the tool head 6 remote from the first portion 7a of the transmission component 7. To advantage, the sensing means 24 will comprise two such feeler elements 25, preferably identical, associated with the second support portion 6b at the end farthest from the first support portion 6a and disposed mutually parallel, one on either side of the tool 22.

Each feeler element 25 presents at least one locating edge 26 designed to rest directly on the bottom wall 3 of the workpiece 2 and thus maintain the tool 22 at a prescribed distance from the wall 3. In other words, each feeler element 25 functions as a spacer between the bottom wall 3 of the workpiece 2 and the tool head 6, hence the tool 22 also.

Referring to the first embodiment of the device illustrated in FIGS. 1 to 5, each feeler element 25 is of essentially plate-like appearance, presenting a substantially square outline, and secured to the tool head 6 by means of respective threaded fastener elements 27. The threaded fastener elements 27 also serve as means by which to adjust the position of each feeler element 25 relative to the tool head 6, and therefore as means allowing selection of the distance by which the tool 22, and consequently the drain hole 5, is separated from the bottom wall 3 of the workpiece 2.

The type of connection between each feeler element 25 and the tool head 6 is such that the single element 25 will be interchangeable with other elements 25 of different sizes, to the end of overcoming potential dimensional constraints on the adjustment of the height at which the drain hole 5 is machined.

In the case of the first embodiment described thus far, when offering the tool 22 to the workpiece 2 in readiness to machine one or more drain holes 5 at a given distance from the bottom wall 3, the tool head 6 is advanced toward the bottom wall 3 along a direction parallel to the longitudinal axis "X" (FIG. 1). At a given point during the movement of the tool 22 toward the bottom wall 3, the feeler elements 25 will enter into contact with the bottom wall 3 of the workpiece 2 (FIG. 2) with the locating edges 26 resting on the surface of the selfsame wall 3.

Figure 3:
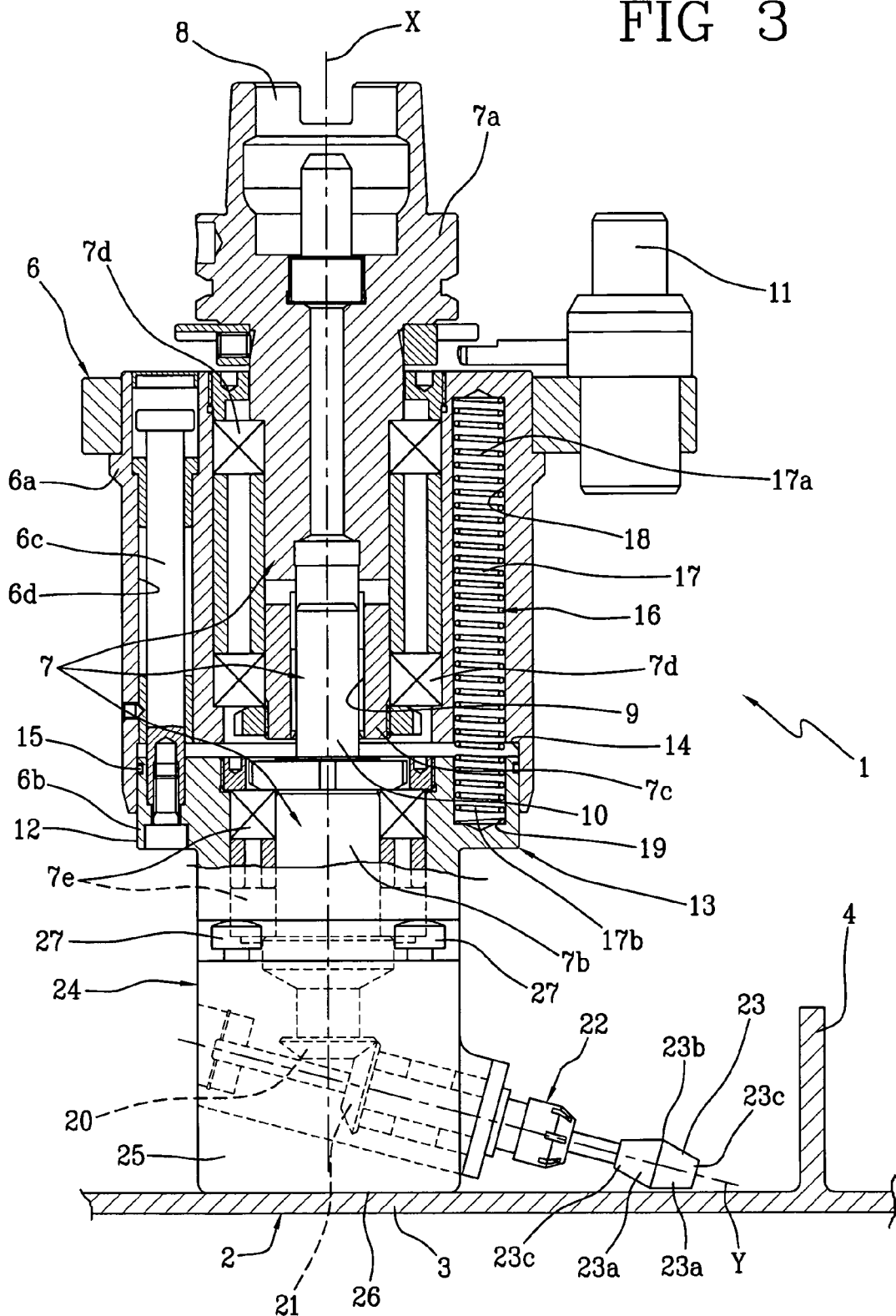
FIG. 3 shows another front elevation of the device as in FIG. 1, viewed partly in section and illustrated during a compensating movement that accompanies the step of engaging the workpiece.

Once contact has been made with the bottom wall 3 of the workpiece 2, the tool head 6 advances further in the same approach direction through a short distance (FIG. 3). Consequently, with the bottom wall 3 opposing the motion of the advancing tool head 6, a contracting movement is induced in the selfsame tool head. The coil springs 16 are compressed to a degree, whereupon the movement of the tool head 6 is halted. In this situation, the particular configuration of the tool head 6 guarantees a dependable identification of the position occupied by the bottom wall 3 of the workpiece 2, which provides the reference for machining each drain hole 5, and without damaging the surface of the wall 3.

Figure 4:
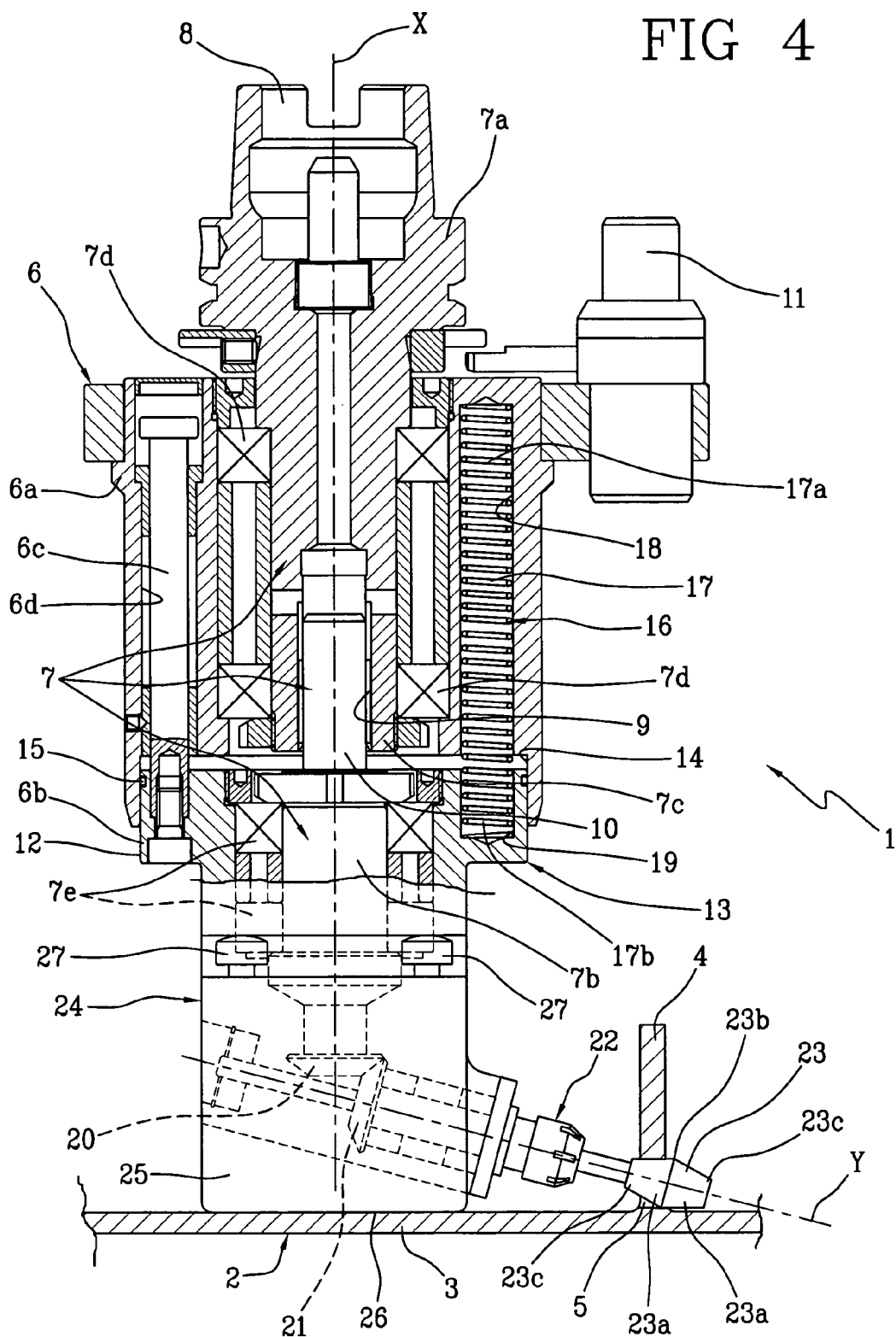
FIG. 4 shows a front elevation of the device in FIGS. 1 to 3, viewed partly in section and illustrated during a step of translating laterally to machine a drain hole.
Figure 5:
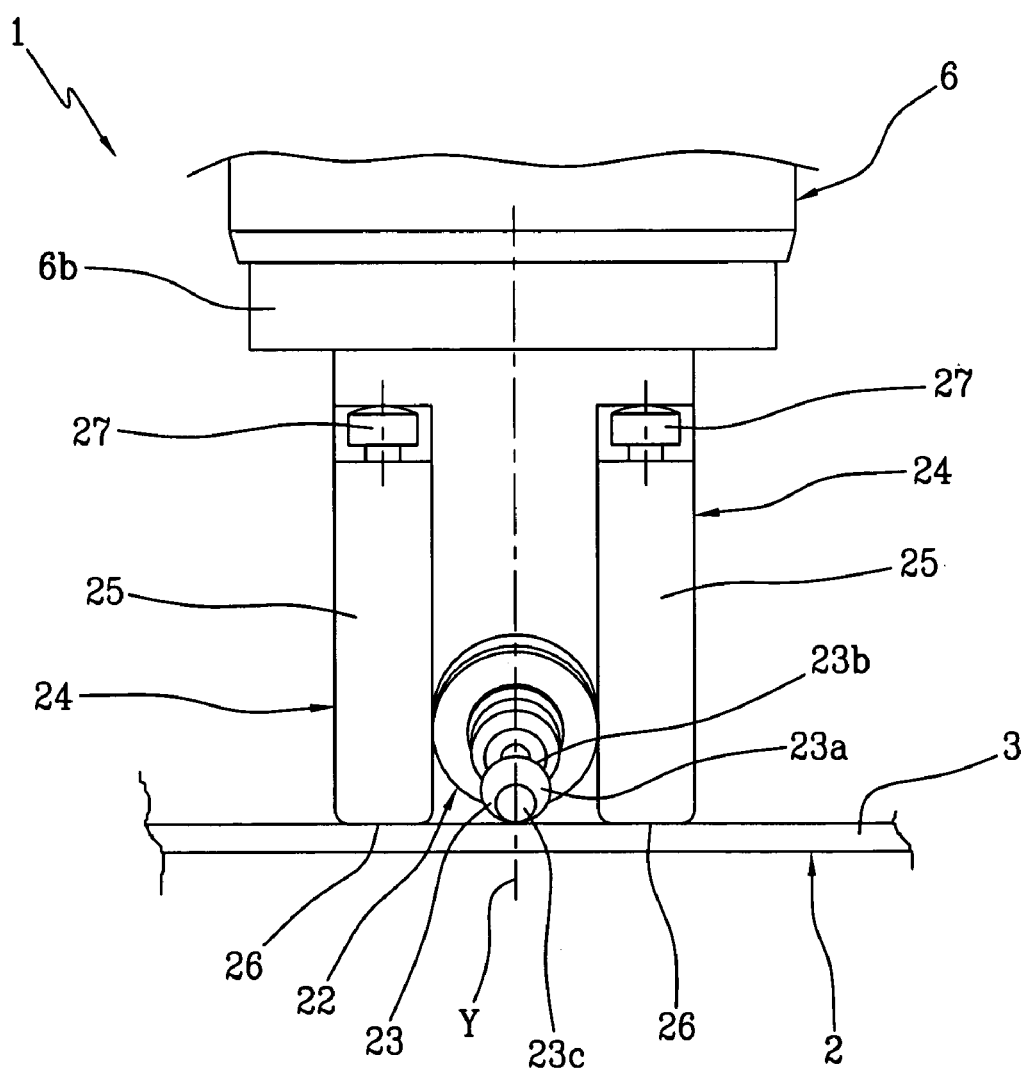
FIG. 5 is a schematic side elevation view of the device as in FIGS. 1 to 4.

Thereafter, the tool 22 is set in rotation about its longitudinal axis "Y" and the tool head 6 translated across the bottom wall 3 of the workpiece 2 toward the transverse stiffening rib 4 in which the hole is to be drilled (FIG. 4).

With the feeler elements 25 adjustable for position, advantageously, the tool 22 can be distanced from a plane coinciding with the locating edges 26, and therefore with the bottom wall 3 of the workpiece 2 when engaged by the tool head 6, so as to create a gap of 3 mm or thereabouts.

To ensure that the feeler elements 25 will sit stably on the surface presented by the bottom wall 3 of the workpiece 2, the tool head 6 is able to contract through a distance greater than that of the gap between the tool 22 and the locating edges 26 of the feeler elements 25 obtainable by way of the aforementioned adjustment. In a preferred embodiment, the tool head 6 would be capable of a contraction measuring at least 10 mm.

To guarantee a suitably stable interaction between the feeler elements 25 and the bottom wall 3 of the workpiece 2, once these same elements are in contact one with another (FIG. 2), the tool head 6 advances further (FIG. 3) until a contraction of approximately 5 mm is obtained. This will guarantee that the bottom wall 3 of the workpiece 2 is reliably located, and the tool 22 thus positioned correctly in relation to the wall.

As an alternative to the first solution illustrated in FIGS. 1 to 5 and described above, the device 1 can be embodied in accordance with a second solution illustrated in FIGS. 6 to 10.

In this instance, the transmission component 7 comprises a single shaft 7f presenting a first portion 7a connectable rotatably by way of a coupling 8 to the drive of the aforementioned machine tool, and a second portion 7b associated rigidly with the end of the first portion 7a remote from the coupling.

The shaft 7f is set in rotation in the same way as described previously with reference to the first embodiment.

In contrast to the first embodiment described, the two portions 7a and 7b of the transmission component 7 are fashioned as one, with no freedom of axial movement one relative to the other. Accordingly, the tool head 6 presents a single and non-variable longitudinal dimension.

In keeping with the structure of the transmission component 7, the tool head 6 presents a single casing structure 28 internally of which the shaft 7f is carried with freedom of rotation, preferably by way of relative bearings 7g. The casing structure 28 is fastenable by way of a fixing appendage 11 to a relative mounting (not illustrated) of the machine tool.

In like manner to the first embodiment described, the second portion 7b of the transmission component 7 terminates in a bevel gear 20 meshing with a further bevel gear 21 attached to a tool 22, preferably a milling cutter 23, designed to pierce at least one transverse stiffening rib 4 and thus fashion a respective drain hole 5. With a bevel drive thus created by the two gears 20 and 21, associated respectively with the transmission component 7 and the tool 22, the tool will be driven in rotation about a relative longitudinal axis "Y" transverse to the longitudinal axis "X" of the shaft whenever the transmission component 7 is set in rotation, as in the case of the first embodiment described.

In the case of the second embodiment illustrated in FIGS. 6 to 10, means 24 by which to sense the bottom wall 3 of the workpiece 2 include at least one feeler element 25 hinged directly to the tool head 6 about a respective pivot axis denoted "Z". Preferably, such sensing means 24 comprise two feeler elements 25 projecting from the end of the tool head 6 opposite to the end presenting the coupling 8, and disposed substantially parallel one with another on either side of the tool 22.

Each feeler element 25 is hinged to the tool head 6 at a point coinciding with a respective pivot axis "Z", and designed to interact with a striking element 29, located to one side of the feeler element 25 remote from the tool head 6, on which the selfsame element 25 comes to rest when the tool head is in a raised position. Each feeler element 25 is thus rotatable about the relative pivot axis "Z" between a first position, resting on the relative striking element 29, and a second position distanced from the selfsame striking element 29 as the result of the locating edge 26 engaging the bottom wall 3 of the workpiece 2.

Observing FIGS. 6 to 9, each feeler element 25 will be seen to present an outline substantially of upturned "L" shape, viewed in profile. More exactly, each feeler element 25 presents a first portion 25a of which one end is hinged to the tool head 6, and the other end is associated with a second portion 25b extending transversely and preferably perpendicular to the first portion 25a. The first portion 25a presents a striking edge 25c placed to engage the striking element 29 when the feeler element 25 occupies the first position, and a forcing edge 25d facing in the opposite direction to the striking edge 25c. The locating edge 26 of the feeler element is presented by the end of the second portion 25b remote from the first portion 25a.

As illustrated in FIGS. 6 to 10, the sensing means 24 comprise at least one sensor 30 for each feeler element 25, incorporated into the tool head 6. Each sensor 30 is associated operatively with the relative feeler element 25 and designed to respond, when the second position of the element 25 is detected, by relaying a signal to the electronic control unit of the tool head 6 such as will interrupt the movement of the tool head toward the workpiece 2.

In a preferred embodiment, each sensor 30 will comprise at least one microswitch 31 wired to the electronic control unit.

With each microswitch 31 mounted directly to the casing structure 28 of the tool head 6, the sensing means will also comprise a transmission element 32 for each feeler element 25, interposed and operating between the selfsame element 25 and the corresponding microswitch 31.

In detail, each transmission element 32 comprises a first end 32a positioned to interact with the forcing edge 25d presented by the first portion 25a of the relative feeler element 25, and a second end 32b positioned to engage the relative microswitch 31 when displaced by the forcing edge 25d.

Advantageously, each transmission element 32 is adjustable for length to facilitate the calibration of the various components that make up the sensing means 24.

As illustrated in FIGS. 6 to 10, each transmission element 32 extends through a housing 33 that extends substantially parallel to the longitudinal axis "X" of the transmission component 7. Also accommodated internally of each housing 33 is a respective coil spring 34 interposed and operating between the first end 32a of the relative element 32 and a locating shoulder 35 positioned at the second end 32b of the element 32. When the relative feeler element 25 is displaced from the first position to the second position, lifting the respective transmission element 32 and operating the relative microswitch 31, the coil spring 33 will be compressed. When the tool head 6 is moved away from the bottom wall 3 of the workpiece 2 and the feeler element 5 pivots from the second to the first position through the force of gravity, each coil spring 33 will assist the return of the respective transmission element 32 to its previous position.

Figure 6:
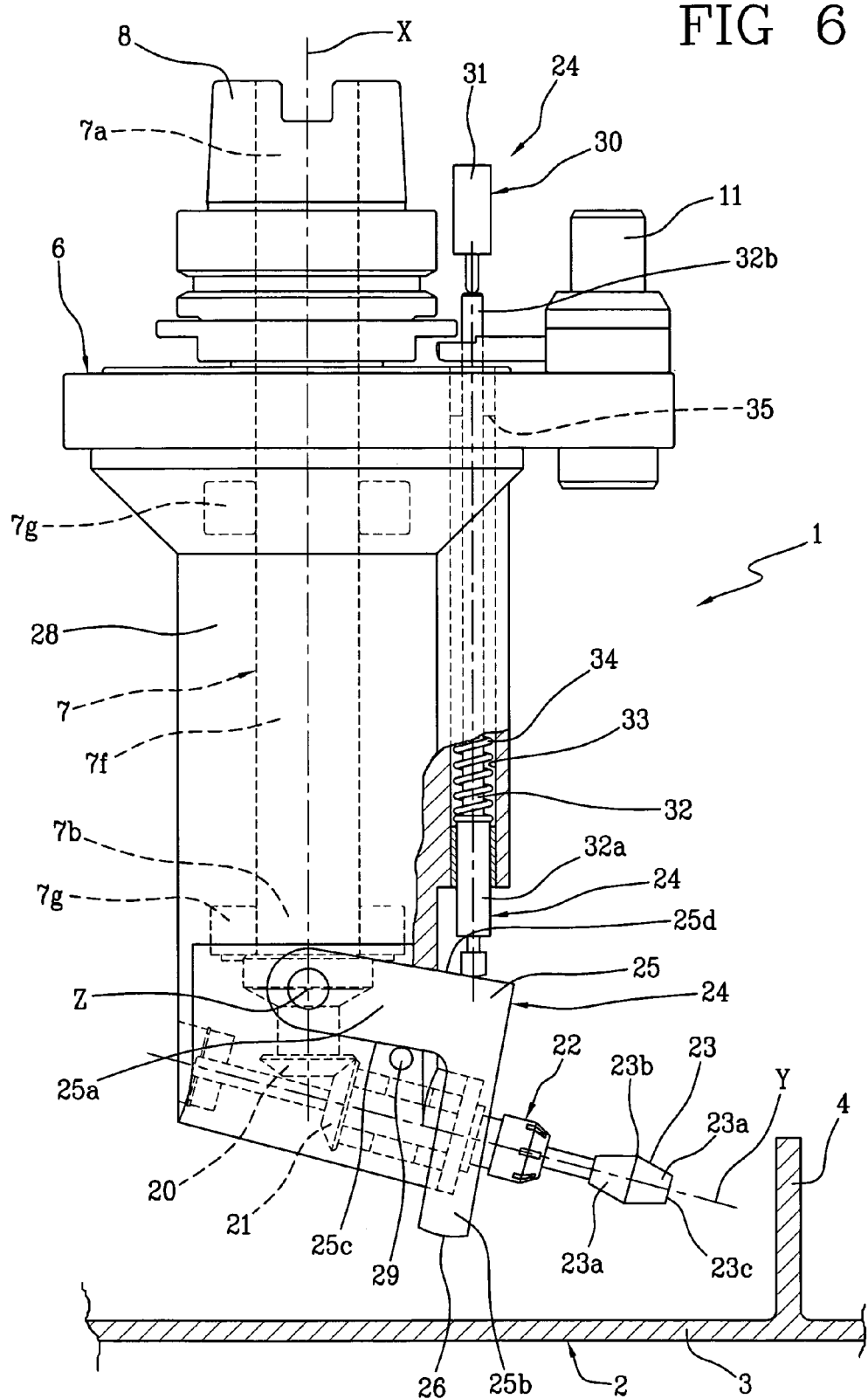
FIG. 6 shows a second embodiment of a device for machining workpieces according to the present invention, viewed in a front elevation, partly in section, and illustrated during a step of approaching a workpiece.
Figure 7:
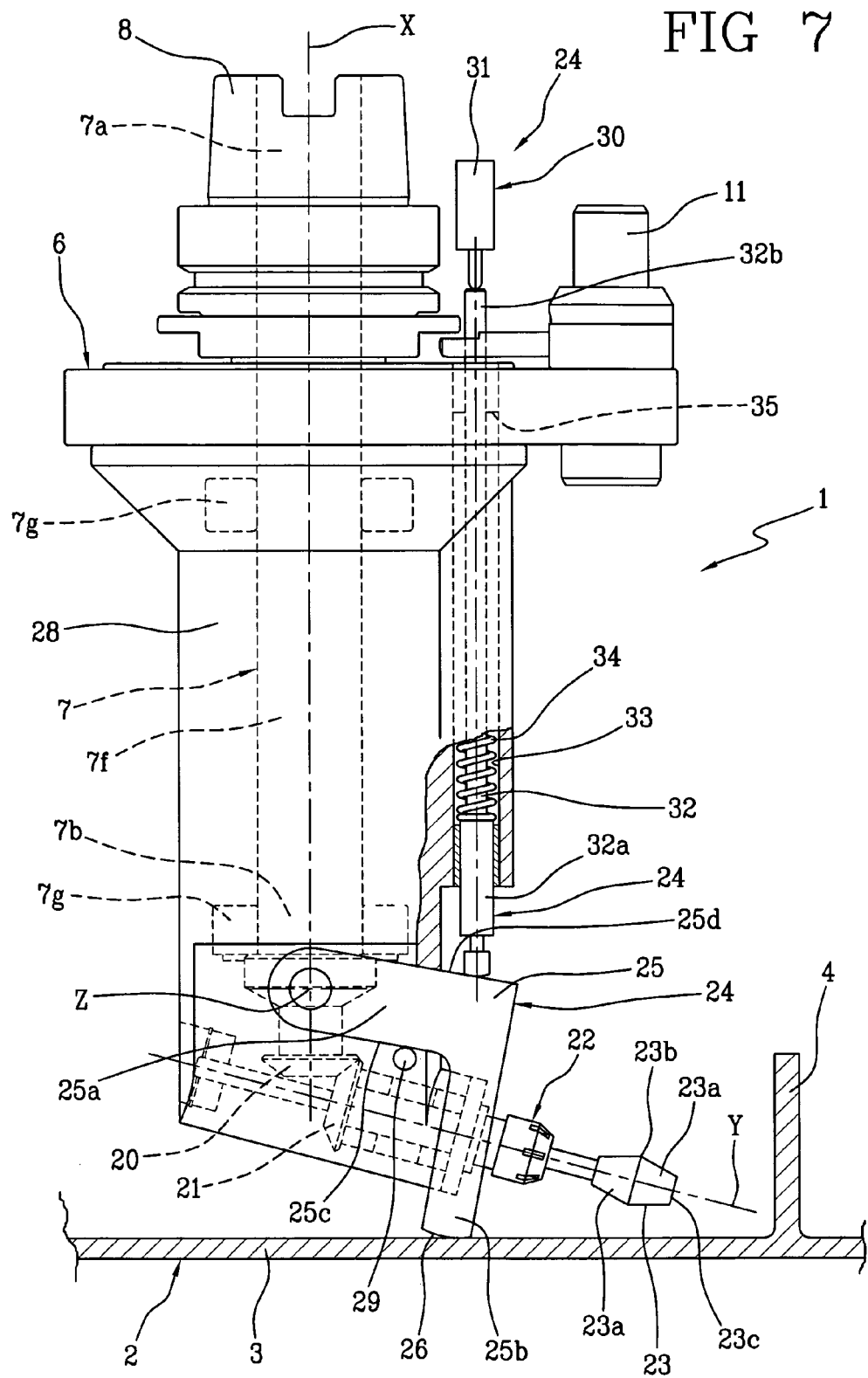
FIG. 7 shows a further front elevation of the device of FIG. 6, viewed partly in section and illustrated during a step of engaging the workpiece.
Figure 8:
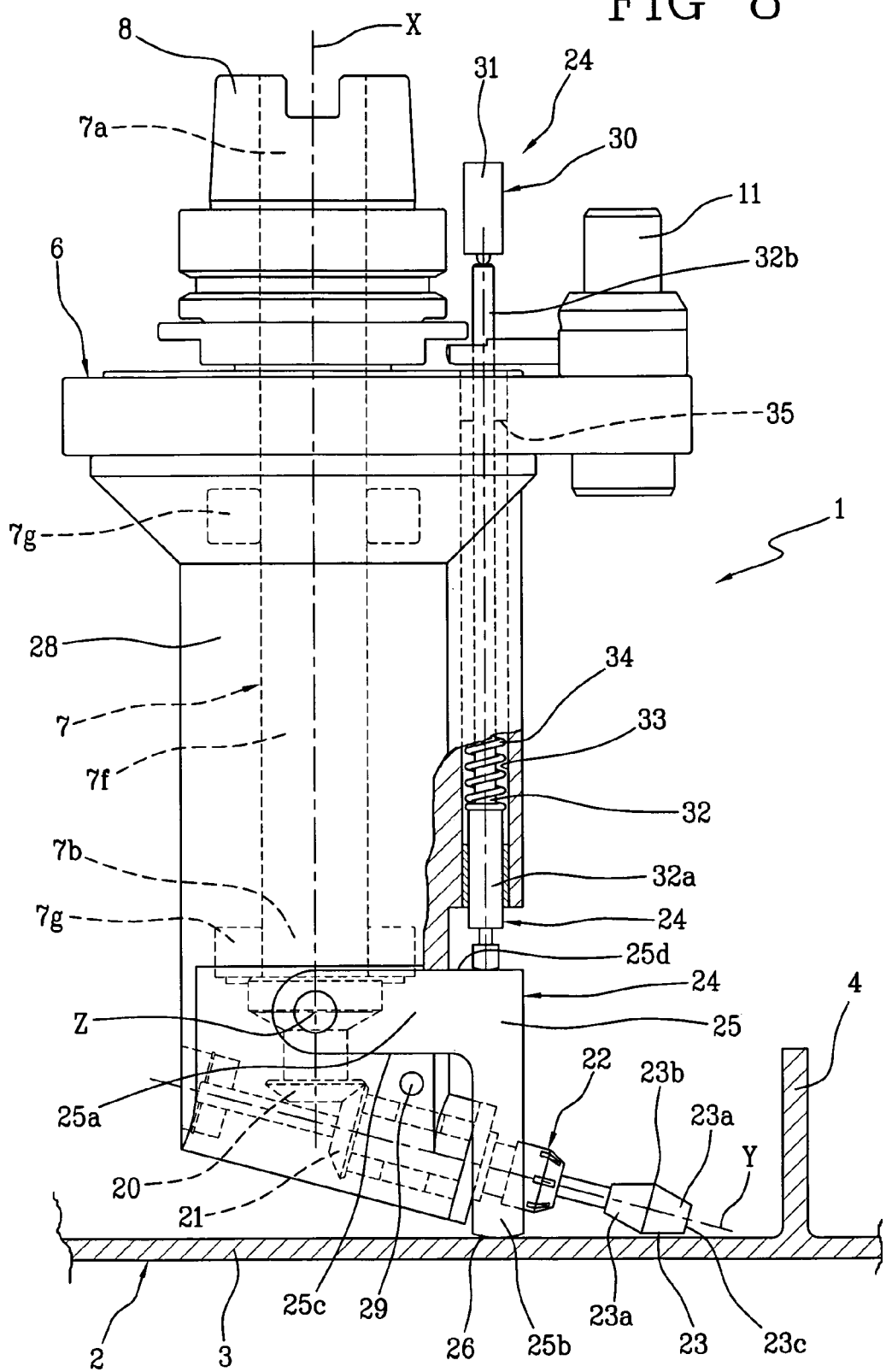
FIG. 8 shows another front elevation of the device as in FIGS. 6 and 7, viewed partly in section and illustrated during a compensating movement that accompanies the step of engaging the workpiece.

As discernible in FIGS. 6 to 9, when the tool head 6 is directed toward the bottom wall 3 of the workpiece 2, each feeler element 25 occupies a first position, that is to say with the striking edge 25c of the corresponding first portion 25a resting on the relative striking element 29 (FIG. 6). As the tool head 6 and the associated tool 22 are shifted toward the bottom wall 3 of the workpiece 2, each feeler element 25 enters into contact with the selfsame bottom wall 3 (FIG. 7), which consequently opposes the advancing motion of the element 25. In this situation, both the tool head 6 and the tool 22 continue to advance, whereas each feeler element 25 is forced by the bottom wall 3 to swing upward about the relative pivot axis "Z". The resulting angular movement of the single feeler elements 25 will bring about a shift from the first position to the second position (FIG. 8), in which the forcing edge 25d of the first portion 25a engages the relative transmission element 32 and lifts it toward the associated microswitch 31. Each transmission element 32 compresses the relative coil spring 33, continuing upward until the second end 32b operates the microswitch 31, which thereupon interrupts the movement of the tool head 6 toward the bottom wall 3 of the workpiece 2.

Figure 9:
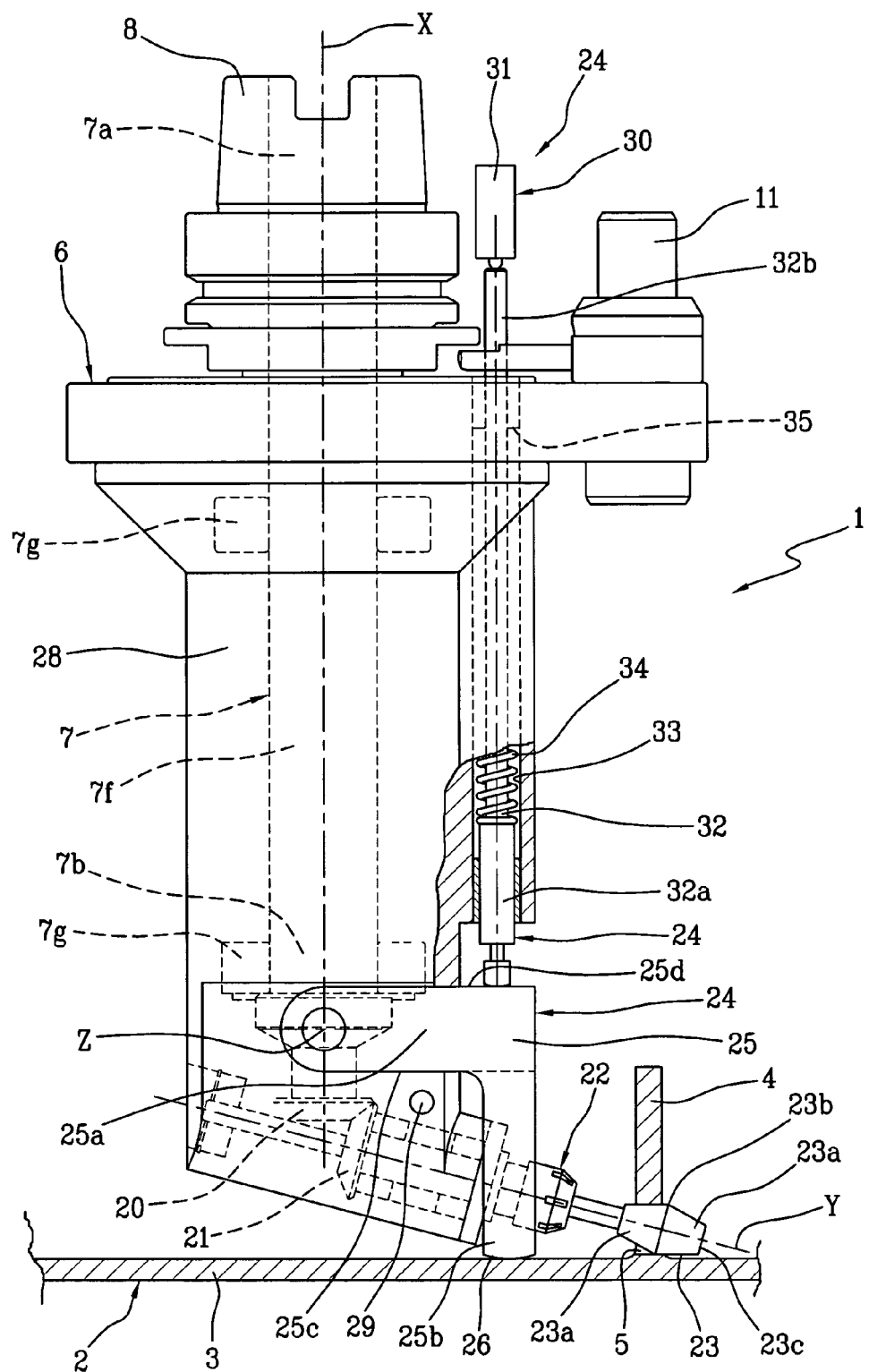
FIG. 9 shows a front elevation of the device in FIGS. 6 to 8, viewed partly in section and illustrated during a step of translating laterally to machine a drain hole.
Figure 10:
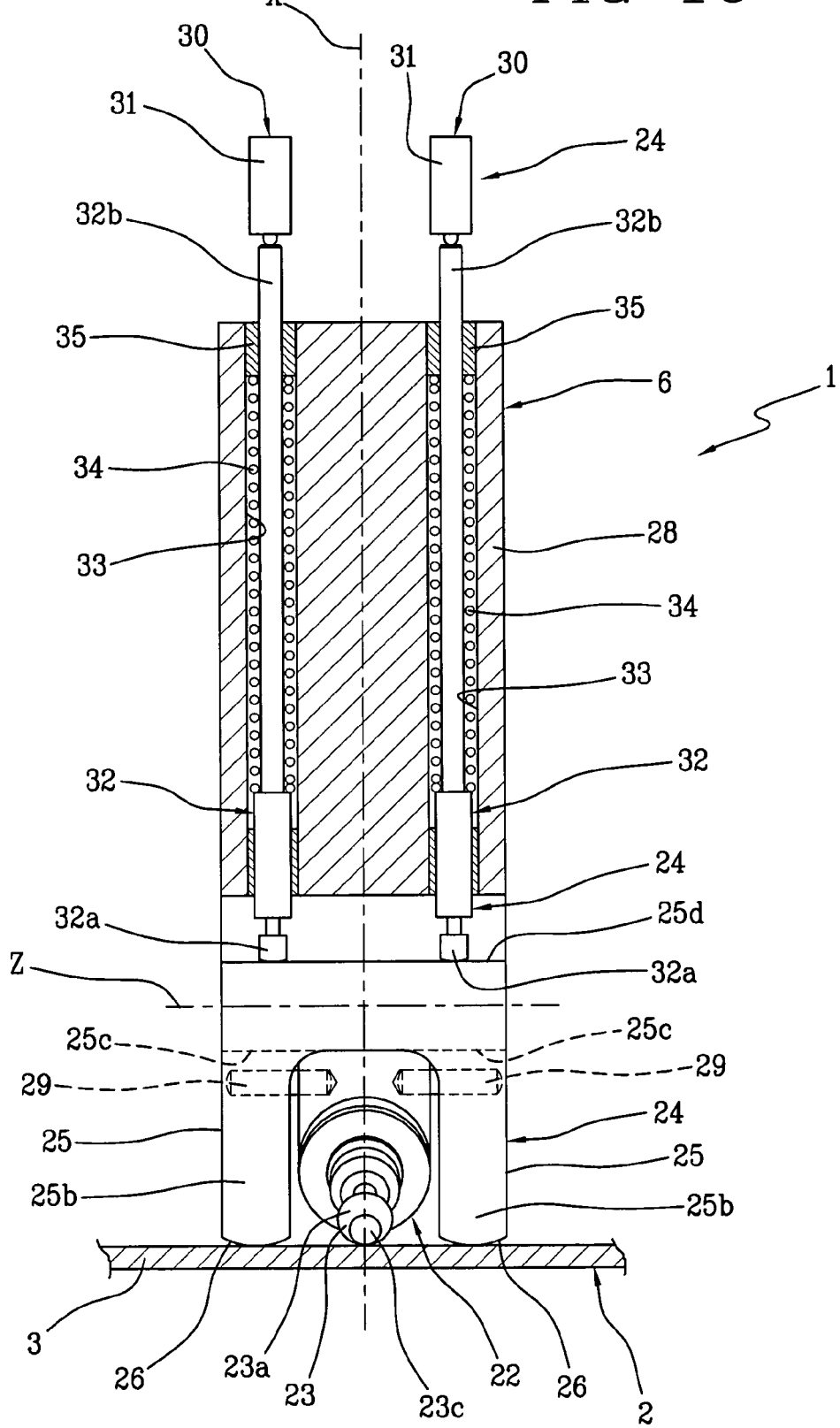
FIG. 10 is a schematic side elevation view of the device as in FIGS. 6 to 9.

Once the descending movement of the tool head 6 has been halted, the tool 22 is set in rotation about its longitudinal axis "Y" and the tool head 6 translated toward the transverse stiffening rib 4 in which the hole is to be machined (FIG. 9).

Advantageously, to simplify the operations involved in replacing tools 22 and other components of the devices 1 described above, both in the first; and in the second embodiment illustrated, the feeler elements 25 are associated with the tool 22 in such a manner as to form a single tool assembly connectable to the tool head 6 by means of suitable attachment means (not illustrated, being of conventional embodiment).

As discernible from FIGS. 1 to 10, the milling cutter 23 of the tool 22 appears preferably as a body appearing as two frustoconical segments 23a of which the section widens toward a central part 23b of the body (greater bases) and tapers toward the two opposite ends 23c (lesser bases).

Figure 11:
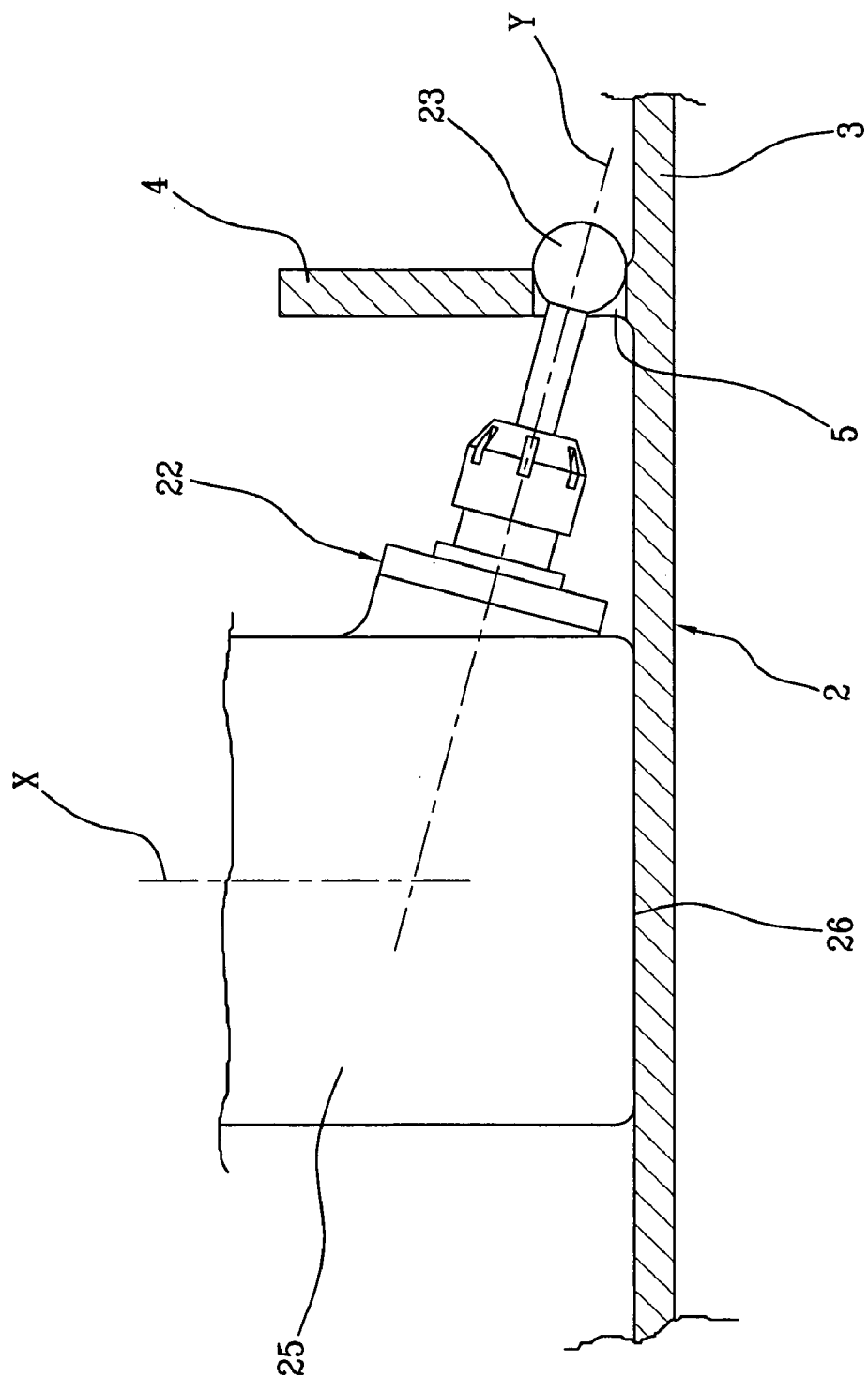
FIG. 11 illustrates an alternative embodiment of a tool fitted to the device as in FIGS. 1 to 10.

The milling cutter 23 might also present a body of substantially spherical geometry as in the example of FIG. 11, which is able to cut a cylindrical hole parallel to the bottom wall 3 of the workpiece 2 notwithstanding the angled orientation presented by the rotational axis "Y" of the tool.

Alternatively, the milling cutter 23 might also present a body substantially of barrel-like geometry, or indeed any other kind of shape able to ensure the machining of cylindrical holes parallel to the bottom wall 3 of the workpiece 2, even with the tool 22 set in rotation about an axis "Y" inclined relative to the selfsame bottom wall.

The drawbacks described at the outset with reference to the prior art are duly overcome by a device 1 according to the present invention.

First and foremost, the device embodied in accordance with the present invention allows the tool to be positioned correctly in relation to the bottom wall of the workpiece without the need for complex systems to detect the position of the workpiece. In effect, the solutions disclosed feature mechanical or electromechanical tool positioning systems that are simple both to implement and to use.

Thanks to the simplicity of these same systems, the device affords a high level of adaptability to any changes in position of the bottom wall presented by the workpiece during the various machining steps. In particular, since the position of the bottom wall presented by the workpiece is sensed by means that are always able to detect its precise location, through direct contact of the feeler elements, the workpiece can be removed easily from the machining station to undergo other types of operation, without adversely affecting the subsequent placement of further drain holes, as these will be machined with the same accuracy.

With a device as described in the foregoing, moreover, the operations of machining drain holes can be automated, since the structural configuration of the device allows the milling cutter to reach areas of the transverse stiffening members located in close proximity to the bottom wall.

The machining procedure can therefore be speeded up significantly, while guaranteeing a faultless cylindrical configuration of the drain holes.

What is claimed is:

1. A device for machining workpieces having a bottom wall and at least one stiffening wall transverse to the bottom wall, said device comprising:
    a tool head equipped with at least one transmission component drivable in rotation about a longitudinal axis of the at least one transmission component, the at least one transmission component having a first portion connectable rotatably to a drive of a machine, and a second portion associated with the end of the first portion opposite to the end connected to the machine;
    at least one tool able to pierce the transverse stiffening wall, connected operatively to the second portion of the at least one transmission component and rotatable by the selfsame at least one transmission component about a longitudinal axis of the at least one tool extending transversely to the longitudinal axis of the at least one transmission component, in such a way that the at least one transverse stiffening wall can be pierced at a point adjacent to the bottom wall; and
    an arrangement by which to sense the bottom wall of the workpiece, including at least one feeler element, hinged about a respective pivot axis to the tool head and projecting from the tool head at the end of the tool head remote from the first portion of the at least one transmission element, in such a way as will maintain the at least one tool a prescribed distance from the bottom wall when the at least one tool is performing the piercing of the at least one transverse stiffening wall, the sensing arrangement also including at least one sensor for detecting a position of the at least one feeler element and triggering an interruption in movement of the tool head toward the bottom wall of the workpiece.

2. A device as in claim 1, wherein the angle formed between a straight line coinciding with the longitudinal axis of the at least one transmission component and a straight line coinciding with the longitudinal axis of the at least one tool is an obtuse angle.

3. A device as in claim 1, wherein the sensing arrangement is configured to operate during the approach movement of the tool head toward the workpiece.

4. A device as in claim 1, wherein the at least one feeler element includes at least one locating edge designed to rest directly on the bottom wall of the workpiece in such a way as will maintain the at least one tool at the prescribed distance from the selfsame wall.

5. A device as in claim 1, wherein the workpieces are aeronautical parts manufactured from solid blocks of raw material.

6. A device as in claim 1, wherein the second portion of the at least one transmission element is operably connected to the at least one tool via bevel gearing.

7. A device as in claim 1, wherein the at least one feeler element comprises two feeler elements.

8. A device as in claim 1, wherein the at least one tool is a milling cutter.

9. A device as in claim 1, wherein the respective pivot axis about which the at least one feeler element is hinged to the tool head is a pivot axis that is transverse relative to the longitudinal axis of the at least one tool.

10. A device as in claim 1, wherein the at least one feeler element is mounted in conjunction with a striking element, located to one side of the at least one feeler element that is remote from the tool head and serving to maintain the at least one feeler element in a predetermined position.

11. A device as in claim 10, wherein the at least one feeler element is rotatable about the respective pivot axis between a first position, in which the at least one feeler element rests on the striking element, and a second position in which the at least one feeler element is distanced from the striking element when a locating edge of the at least one feeler element engages the bottom wall of the workpiece.

12. A device as in claim 11, wherein the at least one feeler element presents an outline substantially of upturned "L" shape, comprising:
    a first portion of the "L"-shape having one end that is hinged about the respective pivot axis to the tool head, the first portion of the "L-shape" having a striking edge placed to interact with the striking element when the at least one feeler element occupies the first position, and a forcing edge facing in the opposite direction to the striking edge;
    a second portion of the "L"-shape extending transversely to the end of the first portion of the "L"-shape opposite to the hinged end, and wherein the end of the second portion of the "L"-shape that is remote from the first portion of the "L"-shape presents the locating edge designed to engage the bottom wall of the workpiece.

13. A device as claimed in claim 12, wherein the second portion of the "L"-shape is perpendicular to the first portion of the "L"-shape.

14. A device as in claim 11, wherein the at least one sensor is incorporated into the tool head and associated operatively with the at least one feeler element in such a way as to detect the second position of the selfsame feeler element and thereupon relay a signal to an electronic control unit governing the operation of the tool head, such as will trigger the interruption in the movement of the tool head toward the bottom wall of the workpiece.

15. A device as in claim 14, wherein the at least one sensor comprises at least one microswitch connected electrically to the electronic control unit.

16. A device as in claim 15, wherein the sensing arrangement comprises at least one transmission element, interposed and operating between the at least one feeler element and the at least one microswitch, of which at least one transmission element a first end is positioned to interact with a forcing edge presented by a first portion of the at least one feeler element, and a second end is positioned to engage the at least one microswitch when the at least one transmission element is displaced by the forcing edge.

* * * * *